United States Patent [19]

Anderson

[11] Patent Number: 4,751,597
[45] Date of Patent: Jun. 14, 1988

[54] CENTER OF PERCUSSION HEAD ACTUATOR ASSEMBLY

[75] Inventor: James C. Anderson, Boise, Id.

[73] Assignee: Hewlett-Packard Company, Palo Alto, Calif.

[21] Appl. No.: 922,587

[22] Filed: Oct. 24, 1986

[51] Int. Cl.$^4$ ............................................. G11B 21/02
[52] U.S. Cl. ........................................ 360/106; 310/36
[58] Field of Search ........................ 360/106, 104–105, 360/97–99; 310/27, 56

[56] References Cited

U.S. PATENT DOCUMENTS

| | | | |
|---|---|---|---|
| 4,150,407 | 4/1979 | Dijkstra | 360/106 |
| 4,300,176 | 11/1981 | Gilovich et al. | 360/105 |
| 4,476,404 | 10/1984 | Bygdnes | 360/105 X |
| 4,654,735 | 3/1987 | Izraelev et al. | 360/105 X |

OTHER PUBLICATIONS

IBM/TDB, vol. 19, No. 4, Sep. 1976, pp. 1437–1438, "Magnetic Shield for Disk File", by Elliot et al.

Primary Examiner—John H. Wolff
Attorney, Agent, or Firm—Leslie G. Murray

[57] ABSTRACT

An improved rotary-type read-write head actuator assembly for use in a rotating disc data storage device is provided. The head actuator assembly includes an elongated actuator arm pivotally mounted at one end and having flexible read-write head support arms at the other end. The elongated actuator arm includes a coil internally mounted within an open cavity at the center of percussion of the actuator arm. The portion of the actuator arm supporting the coil moves within a magnetic field to form a voice coil motor to drive the actuator arm.

7 Claims, 5 Drawing Sheets

CENTER OF PERCUSSION HEAD ACTUATOR ASSEMBLY

BACKGROUND OF THE INVENTION

This invention relates generally to a support assembly for positioning read-write heads in a rotatable magnetic disc storage device and more particularly to a rotary actuator for positioning the read-write heads in a fixed disc drive.

Actuators for positioning read-write heads in rotatable magnetic disc drives are well known. Prior art disc drives typically employ either a linear actuator or a rotary actuator. Linear actuators employ a head support carriage that accesses the tracks on a magnetic storage disc radially. The head support carriage supports the read-write heads at one end and a voice coil motor at the other and rides or slides on cylindrical ways. The carriage is usually a complex die casting optimized for rigidity and low mass to produce a high bandwidth. However, the linear actuator does not lend itself to compact designs and is expensive to fabricate.

A rotary actuator typically comprises a pivoted lightweight bifurcated support arm having the read-write heads at one end and a voice coil motor at the other end. To achieve a compact design having a small drive enclosure the voice coil motor is usually placed near the pivot reducing the actuator lever arm. The rotary actuator therefore tends to suffer from poor mechanical advantage and requires a strong voice coil. Although compared to linear actuators rotary actuators are generally less expensive to fabricate, the motor force loads the pivot bearings requiring the use of expensive precision bearings for the pivot. Further, in use the actuator arm is in a bending mode resulting in increased settle time and a lower servo bandwidth. Inertia of the actuator system limits the speed at which the read-write heads can be moved reducing the head seek time.

U.S. Pat. No. 4,300,176 entitled "Fixed Disc Head Actuator Assembly" issued on Nov. 10, 1981 to Paul A. Gilovich and Joseph S. Tung discloses an actuator assembly for magnetic read-write heads having a pivot at one end of an actuator arm and the heads mounted on a head support extending from the actuator arm at the other end. A coil support and actuator means having a motor coil wound thereon extends from the side of the actuator arm opposite the head support and is positioned between the pivot and the head support. A pair of permanent magnets rigidly mounted to a chassis provide a gap in which the motor coil may move to cause the actuator arm to rotate about the pivot and move the read-write heads into cooperative relationship with one or more magnetic discs. The rotary actuator assembly disclosed by Gilovich et al. overcomes some of the disadvantages of earlier rotary actuators, but, because of the requirement of a coil support extension, does not achieve the compact design desirable in today's trend toward ever smaller disc drives.

SUMMARY OF THE INVENTION

In accordance with the principles of the present invention an improved read-write head actuator assembly for disc drives is provided. The head actuator assembly comprises a rotary type actuator having an actuator arm pivoted at one end and a head support means including a plurality of arms adapted to support magnetic read-write heads at the other end. The actuator assembly includes a motor coil internally mounted within a cavity provided in the actuator arm and disposed adjacent the head support means between the pivot and the head support means. Voice coil motor means including at least one permanent magnet arranged to provide a gap in which the actuator arm may move, rotating the actuator arm about the pivot to move the read-write heads into cooperative relationship with one or more magnetic discs. The motor coil is positioned such that the motor force is applied to the actuator arm at its center of percussion to minimize forces on the pivot bearings and improve response. The present invention provides an actuator design which is compact, light-weight and inexpensive to fabricate. Locating the motor very near the head support means provides the high resonant frequency and servo bandwidth characteristic of linear actuators without the expense of precision rails and bearings and the alignment problems associated with linear actuators. The compact design of the present actuator assembly allows use of a lever arm having greater length than prior art rotary actuators thereby reducing the head yaw angle and the motor power requirements to produce the torque necessary for the desired response.

DETAILED DESCRIPTION OF THE PREFERRED EMBODIMENT

Figure 1:
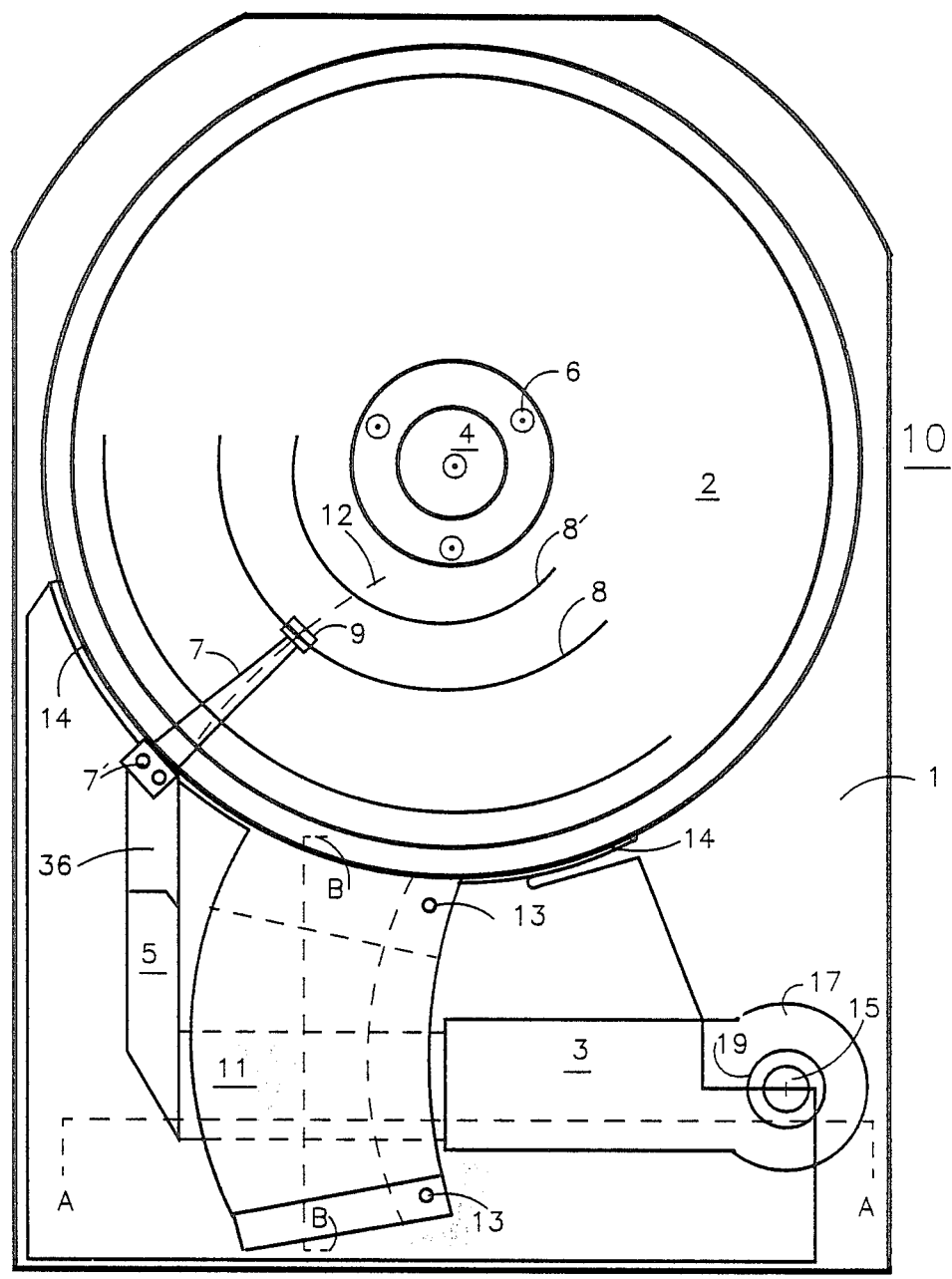
FIG. 1 is a plan view of a magnetic disc drive incorporating a head actuator assembly according to the principles of the present invention.
Figure 2:
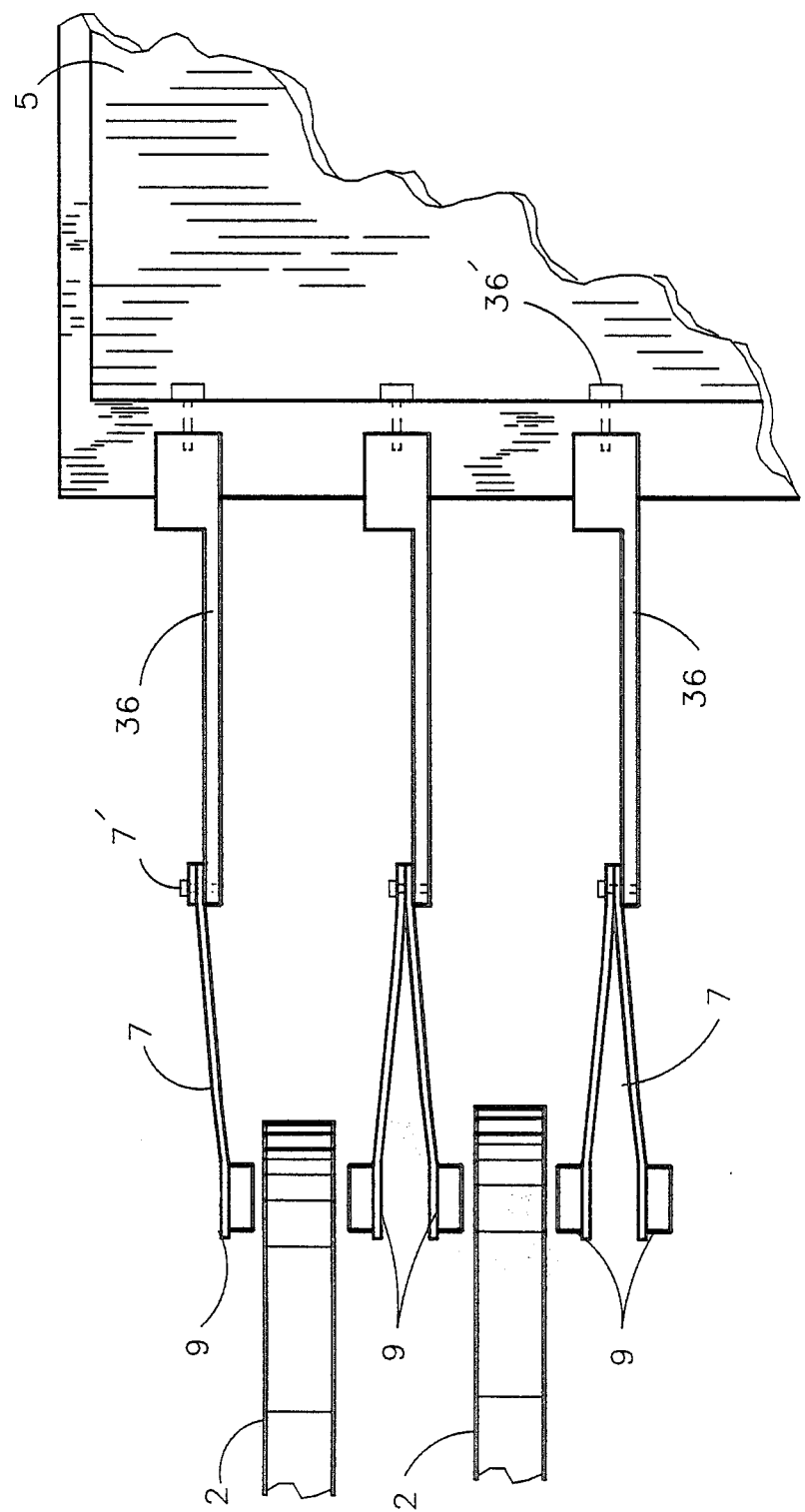
FIG. 2 is a sectional view showing the positioning of the read-write heads of the disc drive shown in FIG. 1.

Referring now to FIGS. 1 and 2 disc drive 10 includes a chassis 1 having magnetic disc 2 mounted on spindle 4 by bolts 6 and a head actuator assembly pivotally mounted on pivot shaft 15. The head actuator assembly includes a head support plate 5 at one end of and formed integral with actuator arm 3. Support arms 36 are attached to support plate 5 with screws 36' to extend outwardly therefrom. Head flexures 7 are attached in pairs to support arms 36 with screws 7' and support magnetic read-write heads 9 which may be any conventional magnetic head assembly. Each head flexure 7 supports a read-write head 9 adjacent an associated surface of disc 2. Attachment collar 17 at the other end is formed intergral with actuator arm 3 and clamps actuator arm 3 to pivot shaft 15. In response to electrical control signals, motor assembly 11 causes actuator arm 3 to rotate about the pivot shaft 15 thereby moving the heads 9 inwardly and outwardly radially on disc 2 along a path approximately shown by dashed line 12 to position heads 9 over a desired information track 8 on the disc 2 to read or write information on the associated disc 2.

Magnetic disc 2 may be a single storage disc or a disc pack having several discs arranged in a stack. Similarly, there may be only one or two heads 9 for cooperating with a single disc or a plurality of heads to read and write information on a stack of associated discs. Magnetic heads 9 cooperate with each surface of the disc 2 as shown generally in FIG. 2.

Figure 3:
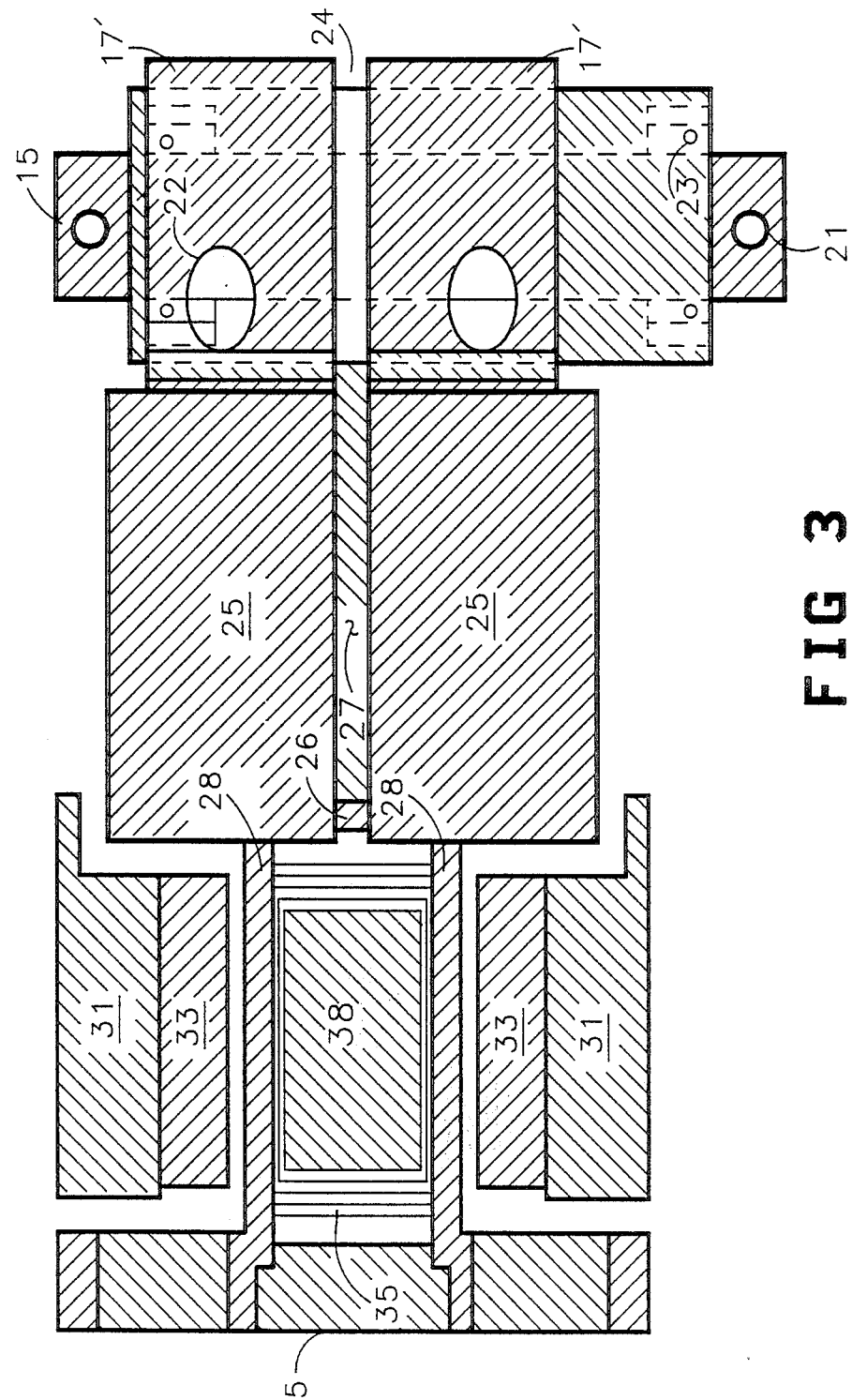
FIG. 3 is a side view of the head actuator assembly taken generally along the line A—A of FIG. 1.

Referring now also to FIG. 3, the actuator arm 3 is clamped to the pivot shaft 15 by compressing collar pieces 17' with screws 22 about pivot shaft sleeve 19 rotatably mounting actuator arm 3 to pivot shaft 15. Pivot shaft 15 is fixedly secured to the chassis 1 by screws 21. Ball bearings 23 are mounted on shaft 15 to maintain the desired spacing of actuator arm 3 with respect to chassis 1 and thus maintain the required spacing relationship between the heads 9 and the surface of the disc 2.

Figure 4:
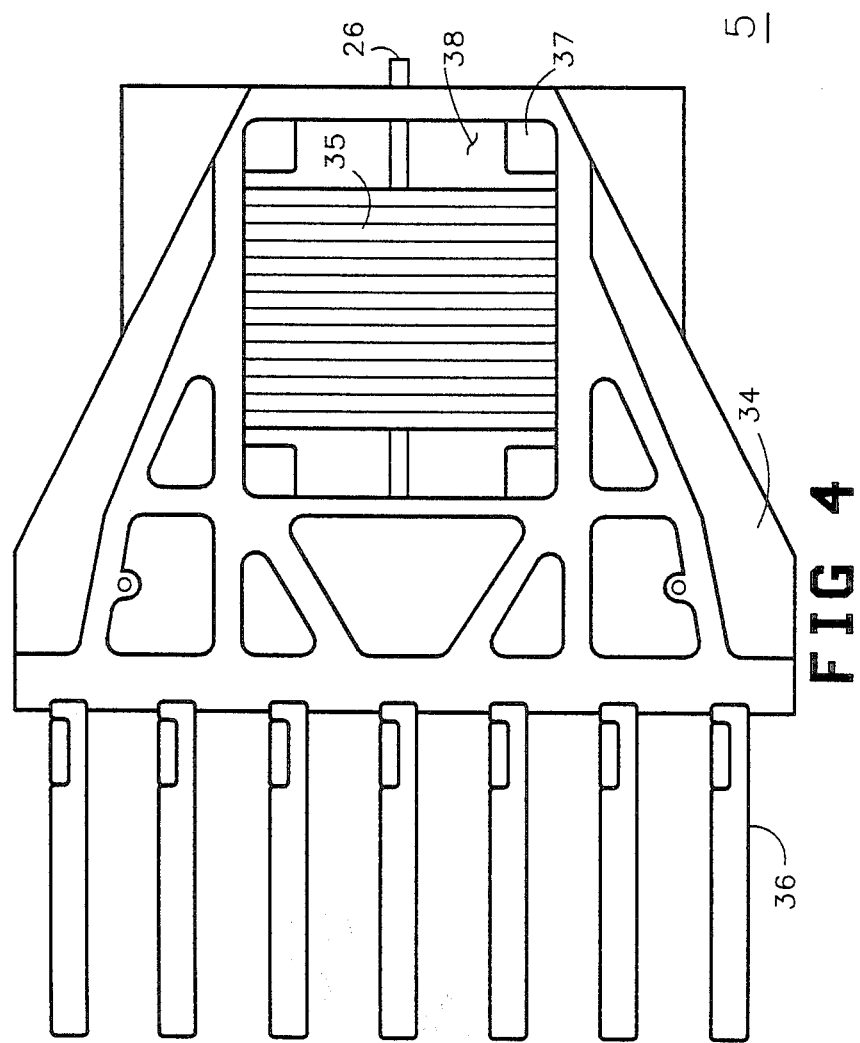
FIG. 4 is an end view of the head actuator assembly of FIG. 1 showing the read-write head support means.

Referring now to FIGS. 3 and 4, the actuator arm 3 including collar 17 and head support plate 5 is cast from a suitable light-weight non-magnetic material such as magnesium. The casting is a single piece having a slot 24 cut into the arm 3 forming collar pieces 17' and arm members 25. Insert 27 is coated with an insulating material and bonded into place positioned between arm members 25. Plates 28 and head support plate 5 define an open cavity 38 into which coil 35 is inserted and bonded in position. Fillets 37 provide additional stiffness for arm 3 and insure accurate placement of coil 35 in cavity 38. Head support plate 5 cast integral with actuator arm 3 comprises support structure 34 and support arms 36 to which the head flexures 7 are secured with screws as shown in FIGS. 1 and 2. Coil 35 is inserted through head support plate 5 into cavity 38 and positioned between fillets 37.

Figure 5:
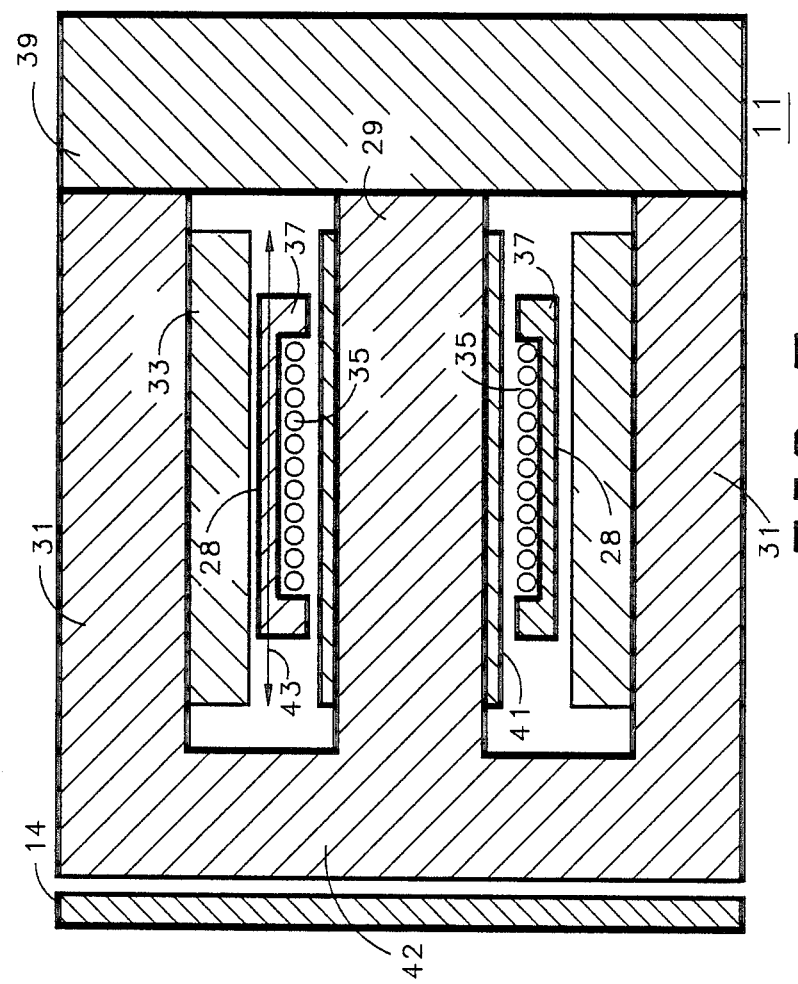
FIG. 5 is a sectional view of the voice coil motor taken generally along the line B—B of FIG. 1.

Referring now also to FIG. 5, the actuator arm 3 is driven by coil 35 disposed within cavity 38. Coil 35 is wound in a generally rectangular form having an open center conforming to the size and shape of cavity 38. The cavity 38 and coil 35 are located at the center of percussion of actuator arm 3 to minimize forces on the pivot shaft 15 and provide rapid response. Motor housing 11 secured to the chassis 1 (as shown in FIG. 1) is of a suitable low reluctance material, such as low carbon steel, and provides a complete magnetic circuit for permanent magnets 33. Magnets 33 of Neodymium-boron-iron or other suitable material are bonded to plates 31 to form gaps between the magnets 33 and center core piece 29. Coil 35 (and actuator arm 3) is disposed within the gap with core piece 29 inserted through the open center of coil 35. End plates 39 and 42 complete the motor housing 11 enclosing permanent magnets 33 to provide a complete magnetic circuit and minimize flux leakage. Shielding plate 14 is inserted between the motor housing 11 and the magnetic disc 2 to minimize leakage flux reaching magnetic heads 9. Motor housing 11 may be assembled from individual plates or machined from a single block of material (as shown in FIG. 5). Shielding plate 14 is made of a low reluctance material such as nickel-steel and positioned as shown in FIG. 1 having a small gap between the shielding plate 14 and motor housing 11 to prevent saturation of the shielding plate 14.

By applying control currents to coil 35, the magnetic fields generate a force which moves the actuator arm 3 transversely within the motor housing as shown by arrow 43 thus rotating the actuator arm 3 about pivot shaft 15. Steel pins 13 act as crash stops to control the deacceleration rate of the heads 9 and to prevent the actuator arm 3 from hitting the motor housing end plates 39 and 42 thus limiting the actuator arm 3 travel to slightly more than 18 degrees of arc. Center core 29 is clad with a sheet 41 of copper which acts as a shorted turn to reduce the inductance of coil 35 thereby decreasing the rise time of the coil current and providing a faster response. To minimize induced currents within the actuator arm 3, insert 27 is coated with an insulating material and pivot shaft sleeve 19 is wrapped with insulating tape prior to clamping the actuator arm 3 to the pivot shaft. In accordance with well established operation, the motor is connected in an electrical servo loop (not shown) and acts as a servo motor responsive to control signals to accurately position the magnetic heads 9.

I claim:

1. A rotary head actuator assembly for use in a disc drive, said disc drive having at least one disc, comprising:
 a pivot assembly;
 an elongated actuator arm having one end pivotally mounted on said pivot assembly and extending from said pivot assembly, said elongated actuator arm having an open cavity formed therein near the other end thereof;
 head support means fixedly attached to said other end of said elongated actuator arm and extending outwardly therefrom, said head support means including a plurality of support arms, each of said support arms for mounting at least one transducer head;
 a coil disposed within said open cavity, said coil having an open center; and
 motor means including a magnetic core piece and at least one permanent magnet providing a magnetic field in which said coil may move in such a direction to cause said elongated actuator arm to rotate about said pivot point, said magnetic core piece inserted through said open center of said coil, said coil responsive to a control signal to provide a motive force to drive said elongated actuator arm such that said transducer heads are positioned to a desired location over said disc.

2. A head actuator assembly as in claim 1 wherein said motor means includes a pair of permanent magnets in spaced-apart relationship forming a gap having the same magnetic pole of each of said magnets in facing relationship across said gap, said magnetic core piece disposed within said gap in spaced-apart relationship with each of and between said magnets, magnetic means associated with the other magnetic pole of each of said magnets, said coil supported within said cavity to move in said gap, said coil surrounding said magnetic pole piece.

3. A head actuator assembly as in claim 2 wherein said magnetic means forms a low reluctance path between said other magnetic pole of each of said magnets and said magnetic core piece to provide a closed magnetic path to minimize leakage magnetic fields.

4. A rotating disc data storage device comprising:
 a chassis;
 at least one data storage disc rotatably mounted on said chassis, said storage disc having a multiplicity of concentric data tracks thereon;
 an elongated actuator arm having one end pivotally mounted to said chassis having an axis of rotation parallel with the axis of rotation of said disc, said elongated actuator arm having an open cavity formed therein near the other end;
 head support means fixedly attached to said other end of said elongated actuator arm and extending outwardly therefrom, said head support means including a plurality of flexure arms, each of said flexure arms for support of at least one read-write head adjacent a major surface of said disc;

coil means disposed with said open cavity, said coil means having an open center; and motor means including a magnetic core piece and at least one permanent magnet providing a magnetic field in which said coil means may move in such a direction to cause said elongated actuator arm to rotate about its axis of rotation, said magnetic core piece inserted through said open center of said coil means, said coil means responsive to a control signal to provide a motive force to drive said elongated actuator arm to position said read-write head over a desired one of said concentric data tracks and to move said read-write head from data track to data track.

5. A rotating disc data storage device as in claim 4 further comprising magnetic shielding means disposed between said motor means and said data storage disc for shielding said data storage disc and said read-write heads from leakage magnetic fields.

6. A rotary actuator assembly for use in a rotating disc drive, said disc drive including a plurality of data storage discs, comprising:

an elongated actuator arm having a collar at one end and a plurality of read-write head support arms at the other end extending outwardly therefrom and normal thereto, said support arms adapted to support a plurality of read-write heads for cooperation with the major surfaces of said data storage discs, said elongated actuator arm having an open cavity disposed near the end opposite said collar;

pivot means for receiving said collar and pivotally supporting said elongated actuator arm for cooperation with said data storage discs;

a generally rectangular shaped coil having an open core disposed within said open cavity;

a pair of permanent magnets in spaced-apart relationship forming a gap having the same magnetic pole of each of said magnets in facing relationship across said gap, first magnetic means disposed within said gap in spaced-apart relationship with each of said magnets, second magnetic means associated with the other magnetic poles of each of said magnets, said coil supported within said open cavity to move in said gap and surround said first magnetic means, said first magnetic means inserted through said open core of said coil.

7. A rotary actuator assembly as in claim 6 wherein said second magnetic means includes magnetic means forming a low reluctance path between said other magnetic pole of each of said magnets and said first magnetic means to provide a closed magnetic path to minimize leakage magnetic fields.

* * * * *